Jan. 24, 1956  J. E. WHITFIELD  2,732,232
SHAFT SEAL
Filed April 1, 1952
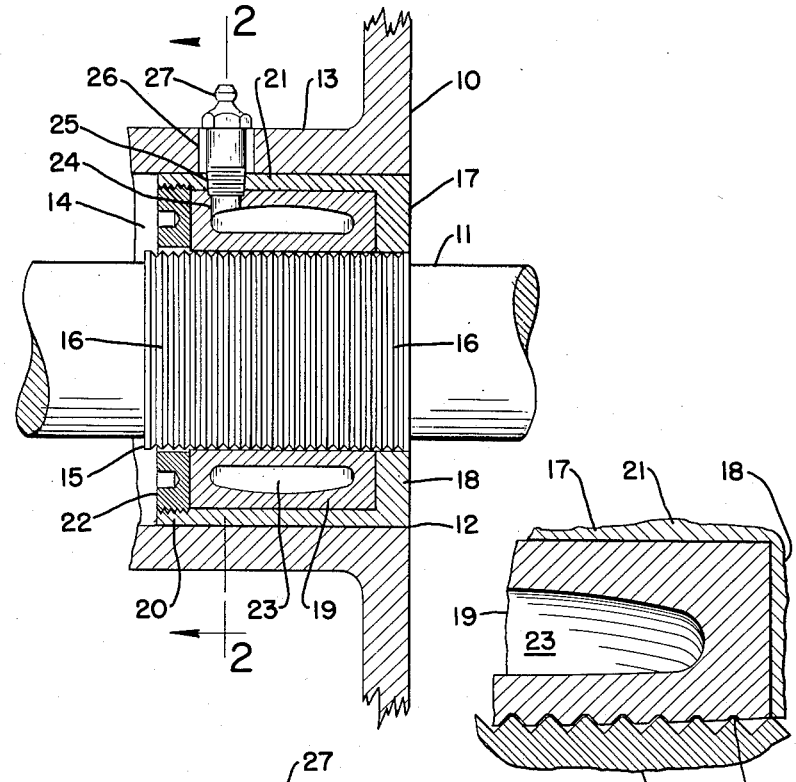
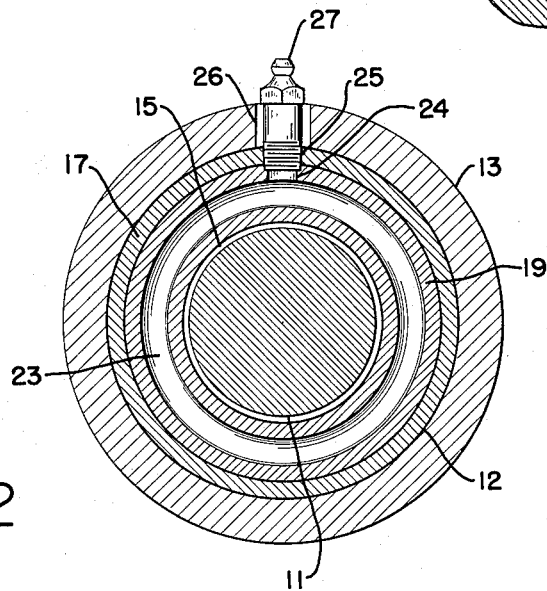
INVENTOR.
Joseph E. Whitfield
BY
Otto Moeller
Attorney

United States Patent Office 2,732,232
Patented Jan. 24, 1956

2,732,232
SHAFT SEAL

Joseph E. Whitfield, Erie, Pa., assignor to Read Standard Corporation, New York, N. Y., a corporation of Delaware Application April 1, 1952, Serial No. 279,749

3 Claims. (Cl. 286—9)

This invention relates to an improved seal between relatively rotatable members such as the rotatable shaft of a rotor or impeller and the stationary compressor, blower or the like casing wall through which the shaft projects.

The principal object of this invention is to provide an improved seal which is very compact, conveniently and easily assembled and inexpensive to make.

Another object is to provide a seal that is simple and efficient with few working parts and which will function efficiently for an exceedingly long time without renewal of any parts thereof.

Still another object is to provide novel means for forming a labyrinth seal in situs.

A still more specific object is to provide a self-contained seal, the sealing element of which is made of a softer material than the shaft and which shaft is provided with a plurality of closely spaced circumferential ridges and in which a pressure is applied to the sealing member urging it into contact with the ridges of the shaft, whereby the ridges cut into the softer material forming therein and maintaining a tortuous minimum practicable clearance path.

These and other objects and features of the invention will become apparent from the following detailed description and the accompanying drawings of a typical and preferred form of the invention, in which drawings Figure 1 is a longitudinal section through my improved seal showing its relation to a rotatable shaft and stationary casing;

Figure 2 is a sectional view taken on the line 2—2 of Figure 1; and

Figure 3 is an enlarged fragmentary sectional view through adjacent parts of the shaft and sealing member showing their operative relation, with the clearance between them exaggerated for clarity.

Referring to the drawings, the reference character 10 designates an end wall of a stationary casing and at 11 is shown a rotatable shaft extending through an oversize opening 12 in the end wall 10. The casing end wall 10 and shaft 11 may be parts of a fluid device or blower of the rotary screw type having interengaging helical rotors as disclosed in my United States Letters Patent No. 2,287,716, granted June 23, 1942. However, it will become apparent from the following description that the invention is of wide application wherever a tight seal for a shaft is desired.

An annular hub-like seal housing member 13, preferably formed integral with the casing end wall 10, registers with the oversize opening 12 and is disposed concentrically of shaft 11 in spaced relation thereto, providing about the projecting portion of shaft 11 an annular space 14.

Within the annular seal housing member 13, the shaft 11 is provided with an enlarged shaft portion 15 provided with a series of closely spaced circumferential inverted V-shaped ridges 16. In the annular space 14 between the enlarged shaft portion 15 and the housing member 13 is disposed the novel and improved shaft seal, which will now be described.

The sealing means includes a cylindrical cartridge or container 17 disposed in the annular space 14 and having a press fit with the inside surface of the annular housing member 13 so as to form a fluid-tight seal therebetween. The outer end of the cylindrical container 17 is open and the inner end, or right hand end as viewed in Figure 1, is formed with an annular end wall 18 fitting closely about the enlarged shaft portion 15 and disposed, when the container 17 is pressed into place, with its outside surface lying flush with the inside surface of the casing end wall 10.

In the container 17 is a cylindrical annularly shaped sealing member 19, the axial length of which is somewhat less than the depth of the container 17, so that when the sealing member 19 is inserted with its inner end face in abutting engagement with the inside surface of the container end wall 18, a portion 20 of the cylindrical wall 21 of the container 17 projects beyond the outer end face of the sealing member 19. The sealing member 19 is also so formed that when inserted in place, its outer and inner cylindrical surfaces are respectively in engagement with the inside surface of the container wall 21, and the ridges 16 of the enlarged shaft portion 15.

The projecting portion 20 of the cylindrical container wall 21 is internally threaded and an annular ring 22 is externally threaded, whereby the ring 22 can be threaded into the outer end of the container 17 to bear against the sealing member 19 and retain it in place in the container 17.

The sealing member 19 is provided with an internal annular axially elongated chamber 23, and a radial threaded passage 24 extending through the outer cylindrical surface of the member 19 and communicating with the chamber 23. The container 17 is provided in its cylindrical wall 21 with a threaded passage 25 arranged, when the sealing member 19 is inserted in place in the container 17, to register with the passage 24 of the sealing member 19. An opening 26 of larger diameter than the passages 24, 25, is provided in the wall of the annular seal housing member 13 and is arranged to be in radial alinement with the passages 24, 25 when the container 17 and sealing member 19 are inserted in place.

Any suitable type of hydraulic grease fitting 27 is inserted in the opening 26 and threaded into the passages 24, 25 whereby through means of a grease gun, grease is introduced under pressure to fill the chamber 23.

The container 17, sealing member 19 and securing ring 22 are preferably assembled as a sub-assembly and pressed into place as a unit.

The sealing member 19 is made of a softer material, preferably though not necessarily a metal, than the shaft 11, thus the shaft 11 including its enlarged ridged portion 15 may be made of steel or an alloy of steel and the sealing member 19 of a Babbitt type metal or other suitable material. Grease is introduced under such pressure into the chamber 23 as to force the inner wall of the chambered sealing member 19 in engagement with the ridges 16 of enlarged shaft portion 15. When the shaft 11 is rotated, the ridges 16, as best shown in Figure 3, cut into the sealing member 19, wearing their own clearance into the sealing member 19 which is serriform in section longitudinally of the shaft 11. There is formed, therefore, a very close clearance between the sealing member and the shaft which is maintained as a result of the continuous pressure exerted by the grease in the chamber of the sealing member. For purpose of clarity this clearance is exaggerated in Figure 3. This together with the greater contact area between the sealing member and the shaft resulting from the ridges of the shaft cutting into the sealing member and the serriform or tortuous clearance path provides a highly efficient seal.

The pressure of the grease in the chamber of the sealing member must of course be sufficient to effect deformation of the sealing member and urge its inner wall portion against the shaft, but not so great as to cause binding of the shaft.

I claim:

1. A seal for a stationary casing and a rotatable shaft extending therethrough comprising, an annular stationary housing projecting from said casing in concentric but spaced relation to said shaft to form therebetween an annular compartment, the portion of said shaft within said housing having a plurality of closely spaced circumferential ridges and grooves, a cylindrical annularly shaped sealing body in said compartment formed of a metal softer than said shaft and adapted to bear against the ridges of said shaft, said body having an annular chamber therein, and means for supplying a flowable material under pressure to said chamber whereby the cross sectional area of said body is expanded and forced towards said shaft to produce ridges and grooves therein complementary to the ridges and grooves in said shaft.

2. A seal in accordance with claim 1, in which said sealing body is formed of a Babbitt type metal and the shaft is formed of steel.

3. A seal for a stationary casing and a rotatable shaft extending therethrough comprising, an annular stationary housing projecting from said casing in concentric but spaced relation to said shaft to form an annular compartment, the portion of said shaft within said housing having a plurality of closely spaced circumferential ridges and grooves, a cylindrical container in said compartment having a press fit with said housing, a cylindrical annularly shaped sealing body of a material softer than said shaft disposed in said container and adapted to bear against the ridges of said shaft, said body having an annular chamber therein, and means for supplying a flowable material under pressure to said chamber whereby the cross sectional area of said body is expanded and forced towards said shaft to produce ridges and grooves therein complementary to the ridges and grooves in said shaft.

References Cited in the file of this patent

UNITED STATES PATENTS

| 888,064 | Chambers | May 10, 1908 |
| 2,287,716 | Whitfield | June 23, 1942 |
| 2,526,172 | Sunde | Oct. 17, 1950 |

FOREIGN PATENTS

| 363,672 | Great Britain | June 17, 1930 |